(12) United States Patent
Harada

(10) Patent No.: US 9,534,761 B2
(45) Date of Patent: Jan. 3, 2017

(54) LENS PLATE FOR ILLUMINATION LAMP, AND ILLUMINATION LAMP

(75) Inventor: Yasuhiko Harada, Higashiosaka (JP)

(73) Assignee: ENDO LIGHTING CORPORATION, Osaka-Shi, Osaka (JP)

( * ) Notice: Subject to any disclaimer, the term of this patent is extended or adjusted under 35 U.S.C. 154(b) by 63 days.

(21) Appl. No.: 14/378,939

(22) PCT Filed: Jul. 19, 2012

(86) PCT No.: PCT/JP2012/068308
§ 371 (c)(1),
(2), (4) Date: Aug. 14, 2014

(87) PCT Pub. No.: WO2013/145351
PCT Pub. Date: Oct. 3, 2013

(65) Prior Publication Data
US 2015/0009683 A1    Jan. 8, 2015

(30) Foreign Application Priority Data
Mar. 26, 2012    (JP) .................................. 2012-069871

(51) Int. Cl.
| | | |
|---|---|---|
| G02B 3/08 | (2006.01) | |
| F21V 5/04 | (2006.01) | |
| B60Q 1/24 | (2006.01) | |
| F21W 101/10 | (2006.01) | |

(52) U.S. Cl.
CPC .............. *F21V 5/045* (2013.01); *B60Q 1/245* (2013.01); *G02B 3/08* (2013.01); *F21W 2101/10* (2013.01)

(58) Field of Classification Search
CPC ............ B60Q 1/245; F21V 5/045; F21V 5/02; F21W 2101/10; G02B 3/08
See application file for complete search history.

(56) References Cited

U.S. PATENT DOCUMENTS

| | | | | |
|---|---|---|---|---|
| 5,128,848 | A | * | 7/1992 | Enders ...................... F21V 3/02 362/268 |
| 7,733,580 | B2 | * | 6/2010 | Ieda ......................... G02B 3/08 359/742 |
| 8,459,860 | B2 | * | 6/2013 | Saito ....................... F21V 5/045 362/339 |
| 2005/0286145 | A1 | | 12/2005 | Silhengst et al. |
| 2006/0034094 | A1 | | 2/2006 | Asada et al. |
| 2008/0253129 | A1 | | 10/2008 | Lin et al. |

(Continued)

FOREIGN PATENT DOCUMENTS

| | | |
|---|---|---|
| EP | 0509679 A2 | 10/1992 |
| EP | 2418415 A1 | 2/2012 |

(Continued)

OTHER PUBLICATIONS

Communication Pursuant to Article 94(3) EPC dated Oct. 6, 2016 for corresponding European application 12873159.3.

*Primary Examiner* — Peggy Neils
(74) *Attorney, Agent, or Firm* — Norton Rose Fulbright US LLP

(57) ABSTRACT

A lens plate and an illumination lamp which are not affected by heat from a light source even if the lens plate is small. The lens plate for an illumination lamp has the lens part covering the light source, and the lens part is formed in such a way that a concentric lens pattern is separately formed on an outer central part and an inner peripheral part so as not to be overlapped.

18 Claims, 6 Drawing Sheets

(56) References Cited

U.S. PATENT DOCUMENTS

2011/0235336 A1* 9/2011 Fritsch .................... F21V 5/04
362/307

FOREIGN PATENT DOCUMENTS

| JP | 59-8201 A | 1/1984 |
|----|-----------|--------|
| JP | P2005-49367 A | 2/2005 |
| JP | P2007-157542 A | 6/2007 |
| JP | P2007-212771 A | 8/2007 |
| JP | P2008-84696 A | 4/2008 |
| JP | P2008-181717 A | 8/2008 |
| JP | P2010-212089 A | 9/2010 |
| JP | P2010-251013 A | 11/2010 |

* cited by examiner

LENS PLATE FOR ILLUMINATION LAMP, AND ILLUMINATION LAMP

TECHNICAL FIELD

The present invention relates to a lens plate for an illumination lamp such as a spot light using a light emitting diode as a light source and to an illumination lamp.

BACKGROUND ART

The following Patent Literature 1 discloses that the above-mentioned lens plate for an illumination lamp forms a Fresnel lens for condensing light on a surface to which light enters from the light source. Patent Literature 2 discloses a Fresnel lens for an illumination lamp wherein a fine pattern of a Fresnel lens is transformed by heat-pressing a transparent soft silicone rubber sheet with a master mold.

CITATION LIST

Patent Literature

PTL 1: Japanese unexamined patent publication No. 2008-084696
PTL 2: Japanese unexamined patent publication No. 2007-212771

SUMMARY OF INVENTION

Technical Problem

The above-mentioned lens plate is generally made of acrylic resin for reducing production cost; however, acrylic resin does not have high heat resistance performance. Therefore, when a Fresnel lens for condensing light is formed on the inner face of a lens plate like PTL 1, the light source and the lens pattern become close, so that the tip end of the lens pattern may be deformed by heat. For preventing such deformation, the Fresnel lens is required to be positioned distant from the light source, which makes it difficult to downsize the lens. On the other hand, when a Fresnel lens is made of material with high heat resistance, the above-mentioned problem is not caused; however, such a complex procedure costs much.

The present invention has an object to provide a lens plate for an illumination lamp and to provide an illumination lamp wherein even a small lens plate is hardly influenced by heat from the light source.

Solution to Problem

The present invention is characterized by a lens plate for an illumination lamp having a lens part covering a light source, wherein the lens part is formed in such a way that a concentric lens pattern is separately formed on an outer central part and an inner peripheral part so as not to be overlapped. The inner part refers to a surface to which light from the light source enters.

The center of the lens pattern can refract light from the light source to the central axis direction, and the periphery of the lens pattern can reflect light from the light source to the central axis direction.

A diffusion area can be formed on the surface without the lens pattern of the outer peripheral part of the lens part.

The diffusion area can be formed with a plurality of facet faces.

A main body provided with the light source of the illumination lamp is covered with the above-mentioned lens plate for an illumination lamp.

The illumination lamp can constitute a spot light.

Advantageous Effects of Invention

In the preferred embodiment of the present invention, the lens pattern is separately formed on the outer central part and on the inner peripheral part of the lens part. Specifically, the central part of the lens pattern is formed on the outer surface of the lens part, so that the amount of incident light into a Fresnel step face is small and light is efficiently transmitted. The central part of the lens pattern becomes distant from the light source, so that the tip end of the lens pattern is hardly deformed by heat. Therefore, the lens part is able to be close to the light source, thus being able to be downsized. The periphery of the lens pattern is formed on the inner face of the lens part close to the light source, so that light from the light source is effectively transmitted even when the lens plate is small.

In such a structure that the diffusion area is formed on the outer circumferential part and the inner central part of the lens without having the lens pattern, color unevenness is reduced when the light source is a white light emitting diode.

DESCRIPTION OF EMBODIMENTS

Figure 1A:
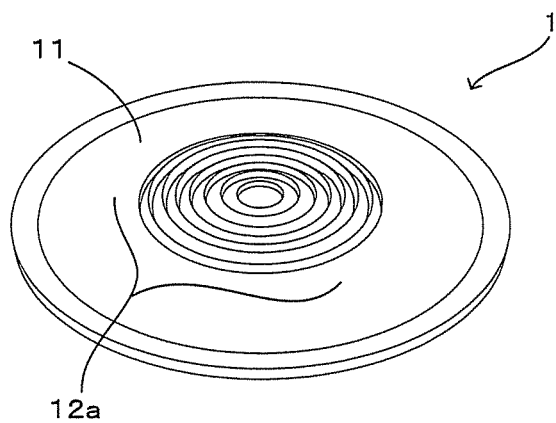
FIG. 1a is a perspective view showing one embodiment of a lens plate for an illumination lamp of the present invention and FIG. 1b is a partially broken view of the lens plate.
Figure 1B:
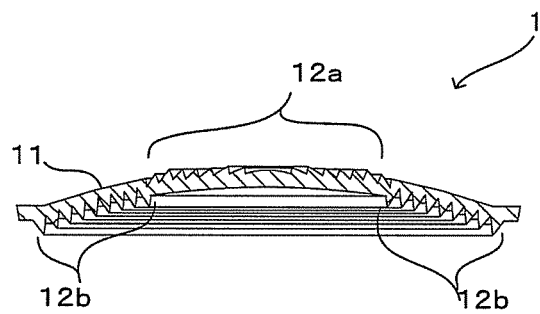
Figure 4:
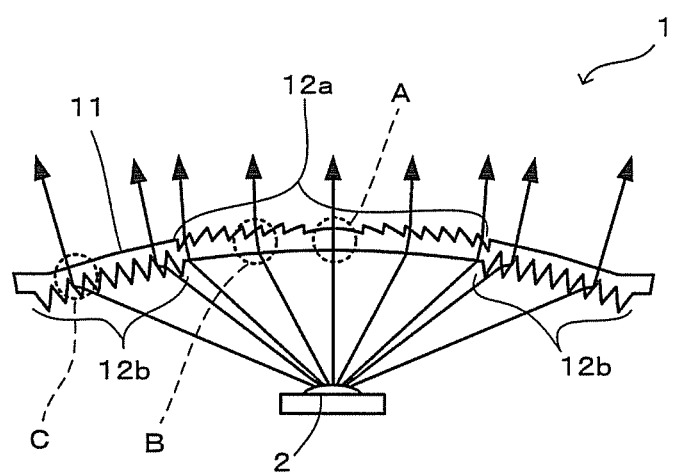
FIG. 4 explains the function of a lens plate for an illumination lamp of one embodiment of the present invention.

As shown in FIG. 1a and FIG. 1b, a lens plate for an illumination lamp 1 of one embodiment of the present invention is made of a transparent material such as acryl or polycarbonate. The lens plate 1 has a lens part 11 for covering the upper surface of a light source 2 such as a light emitting diode (FIG. 4). The translucent material is supposed to be basically colorless and transparent; however, it may be blended with a coloring agent or a diffusing agent such as oxidized titanium. The basic shape of the lens part 11 is formed by cutting a part of the spherical surface with a fixed thickness.

Figure 2:
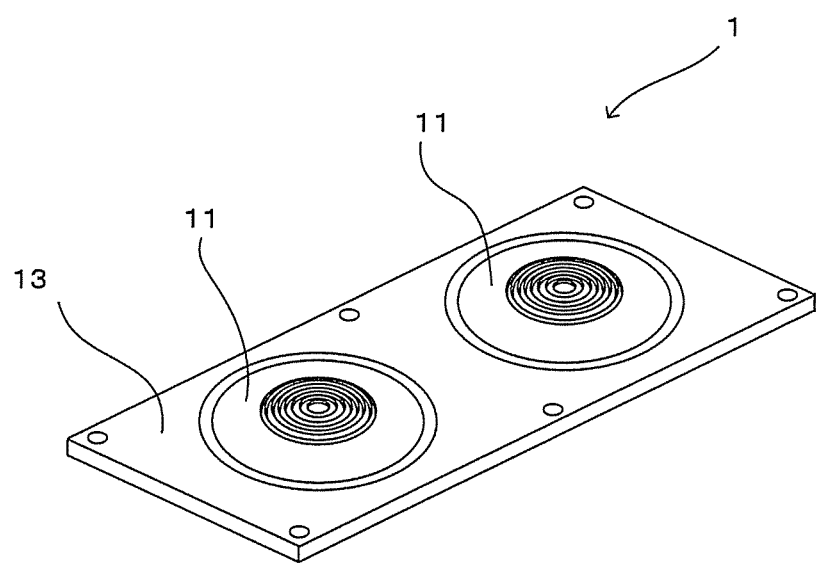
FIG. 2 is a perspective view showing another embodiment of a lens plate for an illumination lamp of the present invention.

As shown in FIG. 2, a plurality of lens parts 11 can be arranged on a common holding part 13. The number of the lens parts 11 is not specifically limited and depends on the number of the light source 2.

The lens part 11 is formed in such a manner that the lens pattern 12 is separately formed on the outer central part and the inner peripheral part so as not to be overlapped when seen in plan view. The inner face is defined as a surface to which light emitted from the light source enters and the outer face is defined as a surface through which the light emits. The central axis of the lens part 11 desirably accords with the central axis of the lens pattern. When light is to be emitted from the lens plate 1 in the oblique direction, the center of the lens part 11 can be displaced from the central axis of the lens pattern 12.

When the light source 2 is high power, heat generated therefrom is large. If the lens plate 1 does not have enough heat resistance, a relatively large distance is required between the light source 2 and the lens part 11, thereby enlarging the lens part 11.

When the lens pattern 12 is formed on the outer central part and the inner peripheral part of the lens part 11 as mentioned above, the center of the lens pattern 12 becomes distant from the light source 2. Therefore, even if the lens part 1 is small, the tip end thereof hardly deforms by heat. The lens part 1 is able to become close to the light source 2, thereby downsizing the lens part 1. The central part of the lens pattern 12 is formed outside, so that the amount of the incident light into a steep inner slope of a circular protrusion (Fresnel step part) becomes small and light is able to be effectively transmitted. The periphery of the lens pattern 12 is formed on the inner face of the lens part 1 close to the light source 2, so that the light from the light source 2 is able to be transmitted through the small lens part 1.

From the similar viewpoint, the lens part 11 can be formed in the shape of a dome protruding outside in such a manner that the center part becomes distant from the light source 2.

The lens plate 1 is supposed to be mainly used for a spot light or a down light and is used for narrowing the light diffusion emitted from the light source 2 by light gathering function. It is desirable that the central part of the lens pattern 12 refract light from the light source 2 into the central axis direction. On the other hand, the periphery of the lens pattern 12 reflects light from the light source 2 into the central axis direction.

Specifically, a circular convex face is formed at the center of the lens pattern 12 and the steep inner slope of the circular protrusion and the shelving outer slope are multiply arranged therearound in a concentric manner. The circular convex face and the slow outer slope of the protrusion form a refraction area 12a for refracting light from the light source 2 in the central axis direction.

Protrusions having a steep inner slope and a steep outer slope are multiply formed outside the refraction area 12a in a concentric manner. The steep outer slope of the protrusion becomes a reflection area 12b which reflects light from the light source 2 in the central axis direction. The lens pattern 12 having the refraction area 12a and the reflection area 12b is a so-called Fresnel lens.

If the light source 2 is a white light emitting diode, the light emitted therefrom is apt to cause color unevenness depending on the light emitting direction. However, if the lens pattern 12 is formed with the circular convex face and a plurality of protrusions and the curved face which causes refraction or full reflection are appropriately controlled as mentioned above, refraction light and reflection light are overlapped on the curved face. Such an advantageous effect inhibits the color unevenness of the illumination light. In addition, unique appearance is obtained by the lens pattern 12 exposed on the outer central part of the lens part 11. The circular convex face and the protrusions constituting the refraction area 12a are short in height and wide in width, so that dust does not stay even on the outer surface of the lens part 11.

Basically, the refraction area 12a is formed on the outer central part of the lens 11 and the reflection area 12b is formed on the inner peripheral part of the lens part 11. On the other hand, such an embodiment is also possible that the refraction area 12a can expand to the inner peripheral part of the lens and the reflection area 12b contracts accordingly, or the reflection area 12b can expand to the inner peripheral part of the lens and the refraction area 12a contracts accordingly.

Figure 3:
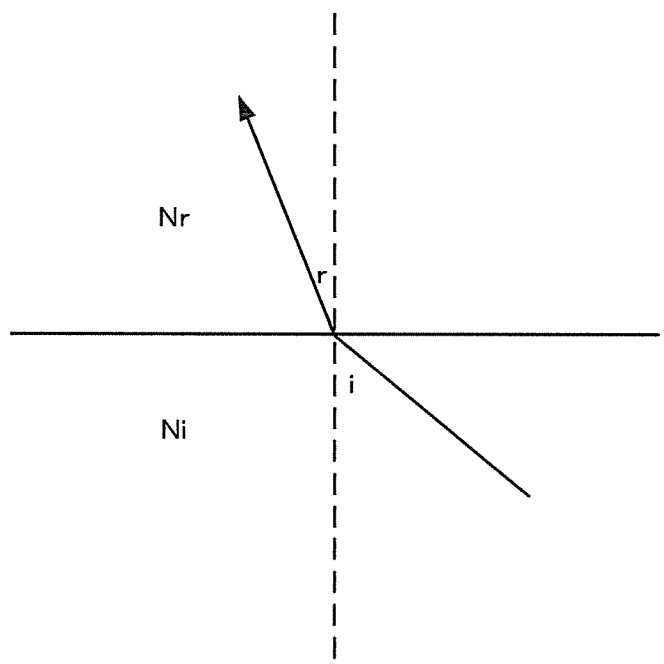
FIG. 3 is a conceptual view explaining light refraction.

Function of the lens part 11 is explained referring to FIG. 3 and FIG. 4.

When an incident angle is defined as "i", a refraction angle is "r", the absolute refractive index of a medium on the light incident side is Ni, and the absolute refractive index of a medium on the light refraction side is Nr, the following well-known Snell's law is established on the boundary face.

$$\sin(i)/\sin(r) = Nr/Ni \qquad \text{Formula 1}$$

Arrows in FIG. 4 show the proceeding directions of the emitting light and the reflection light on the vertical sectional view of the lens part 11.

The region surrounded with a dotted line (A) is the center of the lens pattern 12. The incident light from (the center of) the light source 2 goes straight on the central axis and passes through the lens part 11.

The region surrounded with a dotted line (B) is the refraction area 12a. The incident light is refracted to the central axis direction on the inner face of the lens part 11 in the refraction area 12a. The light is further refracted to the central axis direction on the outer face of the lens part 11 and passes through the lens part 11. The refraction on the inner face and the outer face of the lens 11 satisfies the above-mentioned Formula 1.

The region surrounded with a dotted line (C) is the reflection area 12b. The incident light is refracted on the inner slope of the circular protrusion formed on the inner face of the lens part 11 and fully is reflected on the outer slope of the circular protrusion. The light is further refracted on the outer face of the lens part 11 and passes through the lens part 11. The refractions on the inner slope of the circular protrusion and the outer face of the lens part 11 satisfy the above-mentioned Formula 1. The incident angle to the boundary face is not so large. The full reflection on the outer slope of the circular protrusion plays an important role in the reflection area 12b. The full reflection is caused under the condition that the above-mentioned Formula 1 is not established.

If the absolute refraction index of the translucent material of the lens plate 1 is 1.5, the following formula is obtained from the above-mentioned Formula 1 because the absolute fraction incident of air is 1.

$$\sin(r) = 1.5 \times \sin(i) \qquad \text{Formula 2}$$

This Formula 2 is not established when sin (i) is larger than 1/1.5, 1 divided by 1.5. In other words, the refraction angle "r" which satisfies the Formula 1 does not exist for an incident angle "i" larger than 41 degrees (critical angle) and the incident light is fully reflected.

Figure 5:
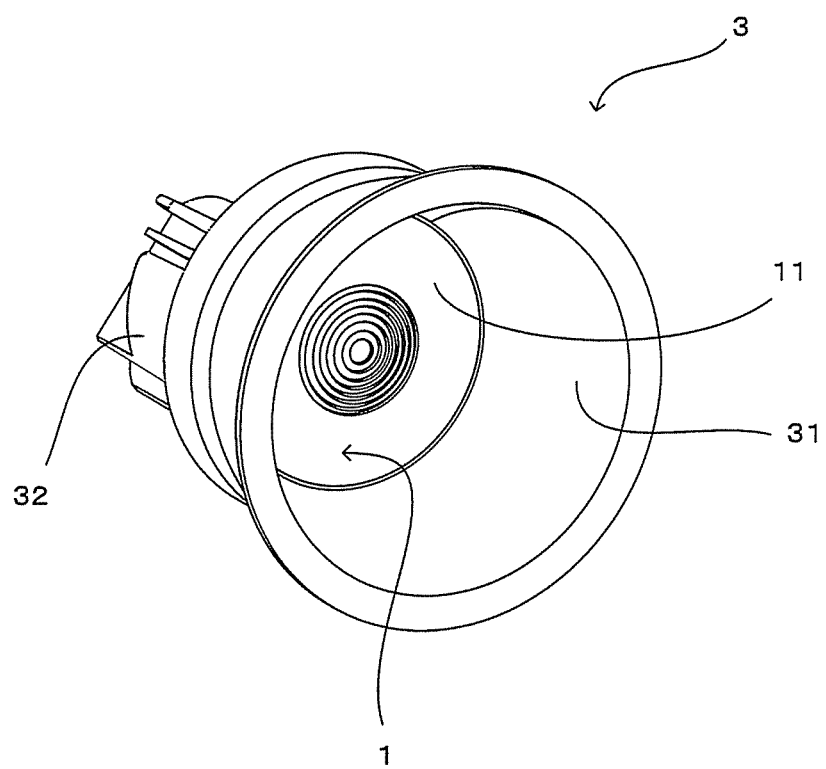
FIG. 5 is a perspective view showing one embodiment of an illumination lamp of the present invention.

FIG. 5 shows an appearance of one embodiment of an illumination lamp 3 using the above-mentioned lens plate 1. The illumination lamp 3 is a spot light wherein the lens plate 1 is fitted deep in a tubular light-shielding hood 31. A mortar-like reflection mirror, not shown in the figure, is provided behind the lens part 11 and the light source 2 constituted with a high-power white light emitting diode is provided at the bottom. A radiator 32 is provided behind the light source 2.

The inner central part and the outer peripheral part of the lens plate 1 without having the lens pattern 12 are smooth faces. When the diffusion area 12c is provided for the outer peripheral part and the inner central part of the lens part 11 without having the lens pattern 12, color unevenness is further inhibited in case of using the white light emitting diode as the light source 2.

Figure 6A:
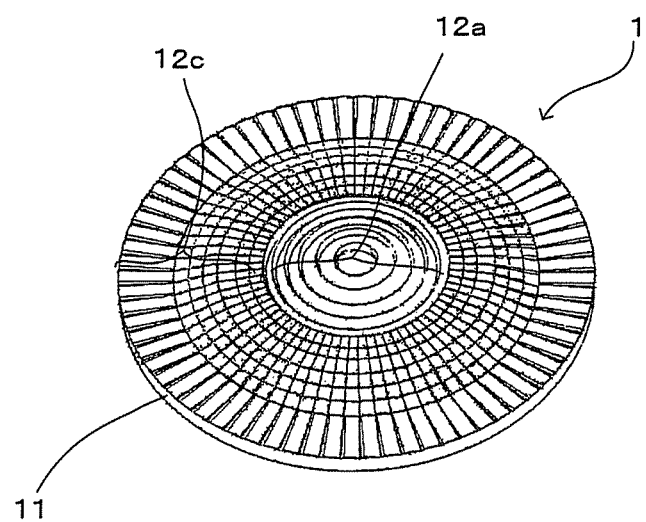
FIG. 6a is a perspective view showing another embodiment of a lens plate for an illumination lamp of the present invention and FIG. 6b is a partially broken view of the lens plate.
Figure 6B:
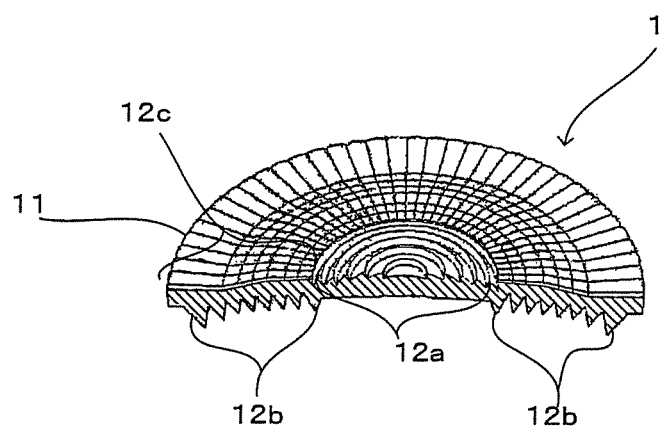

FIG. 6a and FIG. 6b show an embodiment wherein the diffusion area 12c is formed with a plurality of facet faces. The diffusion area 12c surrounds the refraction area 12a on the outer center of the lens part 11. Namely, fine concave faces (facet) are provided like tiles all over the outer circumferential face of the lens 11. If the convex faces are replaced with the concave faces, the same advantageous effects are able to be obtained. The diffusion area 12c can be formed by a frost process or can be formed by a film including a diffusion agent.

REFERENCE SIGNS LIST 1 lens plate for an illumination light
11 lens part
12 lens pattern
12c diffusion surface
2 light source
3 illumination lamp

The invention claimed is:

1. A lens plate for an illumination lamp having a lens part covering a light source, wherein the lens part is formed in such a way that concentric lens patterns are separately formed on an outer face in a center part and an inner face in a peripheral part so as not to be overlapped in a plan view, wherein the outer face in the center part is formed in a shape of a dome protruding outside and the inner face of the center part is formed in such a manner that the inner face of the center part is concave so as to become distant from the light source.

2. The lens plate for the illumination lamp as set forth in claim 1, wherein
the center part of the lens pattern refracts light from the light source to a central axis direction, and the peripheral part of the lens pattern reflects light from the light source to the central axis direction.

3. The lens plate for an illumination lamp as set forth in claim 1, wherein a diffusion area is formed on the outer face in the peripheral part of the lens part.

4. The lens plate for the illumination lamp as set forth in claim 3, wherein the diffusion area is formed with a plurality of facet faces.

5. An illumination lamp comprising a light source and a lens plate, wherein a main body provided with the light source is covered with the lens plate as set forth in claim 1.

6. A spot light comprising a light source and a lens plate, wherein a main body provided with the light source is covered with the lens plate as set forth in claim 1.

7. The lens plate for the illumination lamp as set forth in claim 2, wherein a diffusion area is formed on the outer face in the peripheral part of the lens part.

8. The lens plate for the illumination lamp as set forth in claim 7, wherein the diffusion area is formed with a plurality of facet faces.

9. An illumination lamp comprising a light source and a lens plate, wherein a main body provided with the light source is covered with the lens plate as set forth in claim 2.

10. An illumination lamp comprising a light source and a lens plate, wherein a main body provided with the light source is covered with the lens plate as set forth in claim 3.

11. An illumination lamp comprising a light source and a lens plate, wherein a main body provided with the light source is covered with the lens plate as set forth in claim 4.

12. An illumination lamp comprising a light source and a lens plate, wherein a main body provided with the light source is covered with the lens plate as set forth in claim 7.

13. An illumination lamp comprising a light source and a lens plate, wherein a main body provided with the light source is covered with the lens plate as set forth in claim 8.

14. A spot light comprising a light source and a lens plate, wherein a main body provided with the light source is covered with the lens plate as set forth in claim 2.

15. A spot light comprising a light source and a lens plate, wherein a main body provided with the light source is covered with the lens plate as set forth in claim 3.

16. A spot light comprising a light source and a lens plate, wherein a main body provided with the light source is covered with the lens plate as set forth in claim 4.

17. A spot light comprising a light source and a lens plate, wherein a main body provided with the light source is covered with the lens plate as set forth in claim 7.

18. A spot light comprising a light source and a lens plate, wherein a main body provided with the light source is covered with the lens plate as set forth in claim 8.

* * * * *